Figure 1:
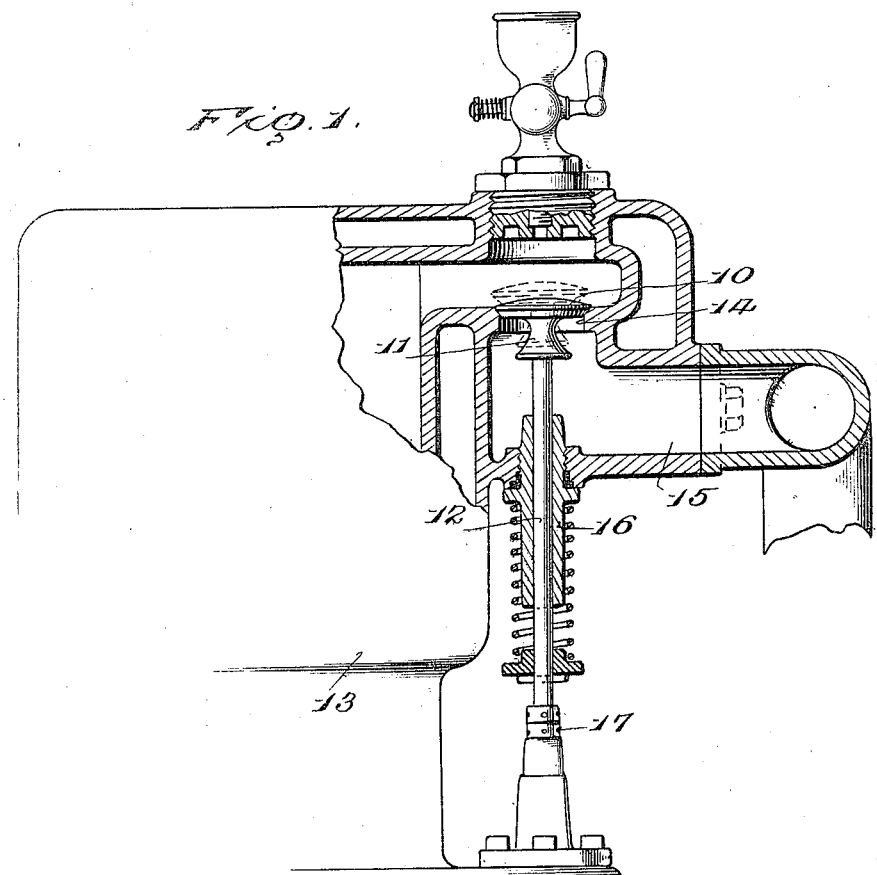

A. MUNTER.
INTERNAL COMBUSTION ENGINE VALVE.
APPLICATION FILED MAR. 21, 1917.

1,232,593. Patented July 10, 1917.

Inventor
Alfred Munter
By
Attorneys.

UNITED STATES PATENT OFFICE.

ALFRED MUNTER, OF BUXTON, NORTH DAKOTA.

INTERNAL-COMBUSTION-ENGINE VALVE.

1,232,593.         Specification of Letters Patent.         Patented July 10, 1917.

Application filed March 21, 1917. Serial No. 156,325.

*To all whom it may concern:*

Be it known that I, ALFRED MUNTER, a citizen of the United States, residing at Buxton, in the county of Traill and State of North Dakota, have invented certain new and useful Improvements in Internal-Combustion-Engine Valves, of which the following is a specification.

This invention relates to an improved valve for internal combustion engines and has as its primary object to provide a device of this character especially designed for use as an exhaust valve.

The invention has as a further object to provide a valve formed to direct the exhaust escaping through the port of the valve away from the valve stem to thus prevent overheating of the valve stem and its consequent sooting and sticking.

The invention has as a further object to provide an arrangement wherein the valve body will be formed with a bell-shaped shank which will form a deflecting member adapted to direct the exhaust away from the valve stem.

And the invention has as a still further object to provide an arrangement wherein the weight of the valve will not be materially increased and wherein the valve may be used upon substantially any conventional type of internal combustion engine.

Other and incidental objects will appear as the description proceeds and in the drawings wherein I have illustrated the preferred embodiment of the invention and wherein similar reference characters designate corresponding parts throughout the several views.

Figure 2:
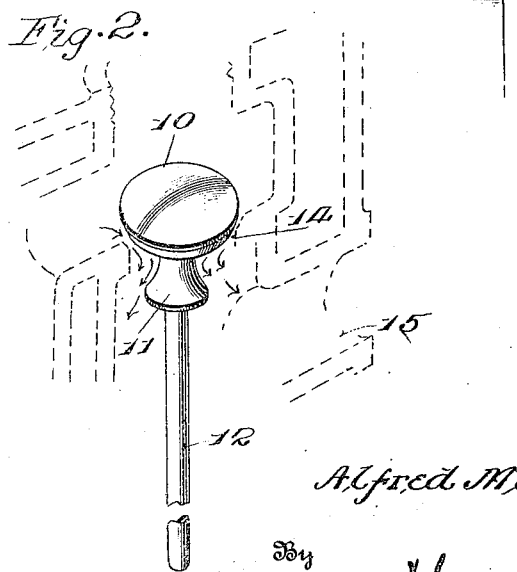

Figure 1 is a fragmentary sectional view showing my improved valve in connection with a conventional type of internal combustion engine, the valve being shown in elevation, and Fig. 2 is a detail perspective view of the valve.

In carrying out the invention, I employ a valve body 10 beveled at its periphery in the usual manner to engage a valve seat. Extending laterally from the lower side of the valve body and arranged axially thereof is a substantially bell shaped or outwardly and downwardly flared shank 11. This shank is preferably formed integral with the valve body and is arranged with its larger end presented downwardly to provide, as shall presently appear, a deflecting member for the valve stem. Extending axially from the lower end of the shank 11 is a valve stem 12 preferably formed integral with the said shank. In this connection, it may be stated that while I have indicated that the shank 11 is formed integral with the valve body 10 and the stem 12 is formed integral with the shank 11 still, it will be seen that these parts may be otherwise connected, as desired. Furthermore, it should be stated that since valves of the type represented by the present invention are often formed with a special design of valve body, the shank 11 may, if desired, be employed in connection with such a specially constructed valve body to overhang the stem of the valve for the purposes which shall presently appear.

In order that the mounting and operation of my improved valve may be accurately understood, I have, in the drawings, shown the device in connection with a conventional type of internal combustion engine 13 formed with a valve seat 14 having an exhaust passage 15 communicating therewith. Entering through the lower wall of the passage 15 is the valve guide 16 and arranged below the valve guide is a valve push rod 17. In mounting the valve, the body 10 thereof is arranged to coöperate with the seat 14 with the valve stem 12 slidably received through the guide 16 and disposed for engagement, at its lower end, by the push rod 17. Accordingly, it will be seen that when the valve is lifted by the rod 17 to permit the escape of the exhaust through the passage 15, the heated gases of the exhaust will, upon passing through the valve seat 14, immediately strike the shank 11 of the valve body to be directed thereby laterally away from the valve stem. This shank thus provides a deflecting member tending to prevent the heated gases from striking directly against the valve stem to thus overcome the consequent sooting and overheating of the valve stem which would otherwise occur and result in the sticking of the valve.

It will therefore be seen that I provide a particularly simple and efficient construction for the purpose set forth and an arrangement wherein the weight of the valve will not be materially increased. Furthermore, the valve may be employed in connection with substantially any conventional type of internal combustion engine and it is to be noted that the deflecting member provided by the shank 11 of the valve body will act as a reinforcement for the valve stem and provide a reinforced connection between the valve stem and the valve body tending to prevent the breaking off of the valve stem at the valve body. Also, as will be seen, in view of the preceding description, the deflecting member may be formed as an outwardly and downwardly flared flange upon the valve stem 12 without, in the slightest, departing from the spirit of the present invention and I do not, therefore, wish to be limited to the particular arrangement of having the said deflecting member formed as a shank upon the valve body.

Having thus described the invention, what is claimed as new is:

1. A valve of the character described including a valve body, a valve stem extending from the valve body, and a deflecting member for the valve stem projecting laterally therefrom beneath the valve body and closed at its lower end.

2. A valve of the character described including a valve body, a valve stem projecting from the valve body, and a deflecting member for the valve stem arranged beneath the valve body, the said deflecting member being contracted intermediate of its ends and flared outwardly and downwardly from the contracted portion thereof.

3. A valve of the character described including a valve body, a shank carried by the valve body and laterally enlarged at its lower extremity, and a valve stem extending from the lower extremity of the shank with the enlarged portion of the shank providing a deflecting member for the valve stem.

4. A valve of the character described including a valve body, a valve stem extending therefrom, and a deflecting member for the valve stem integrally formed at one extremity with the valve body and integrally formed at its opposite extremity with the valve stem, the said deflecting member projecting laterally with respect to the stem.

5. A valve of the character described including a valve body, a solid deflecting member extending from the valve body and laterally enlarged at its lower extremity, and a valve stem projecting axially from the lower end of the said deflecting member.

In testimony whereof I affix my signature.

ALFRED MUNTER. [L. S.]